United States Patent
Marsh

[11] 3,945,575
[45] Mar. 23, 1976

[54] RECOVERY OF SALVAGEABLE COMPONENTS FROM WASTE MATERIALS

[75] Inventor: Paul G. Marsh, Hamilton, Ohio

[73] Assignee: Black Clawson Fibreclaim Inc., New York, N.Y.

[22] Filed: Oct. 7, 1974

[21] Appl. No.: 512,922

Related U.S. Application Data

[63] Continuation-in-part of Ser. No. 332,886, Feb. 16, 1973, abandoned, which is a continuation-in-part of Ser. No. 99,986, Dec. 21, 1970, Pat. No. 3,720,380.

[52] U.S. Cl. ............................. 241/20; 241/DIG. 38
[51] Int. Cl.² ........................................ B02C 23/26
[58] Field of Search .......... 241/DIG. 38, 15, 20, 21, 241/24; 209/454, 456, 457, 466, 494

[56] References Cited
UNITED STATES PATENTS

| | | | |
|---|---|---|---|
| 2,212,467 | 8/1940 | Constant | 209/454 X |
| 2,275,849 | 3/1942 | Fraser | 209/494 X |
| 2,586,574 | 2/1952 | Smith | 209/457 X |
| 3,605,243 | 9/1971 | Oster | 241/20 |
| 3,650,396 | 3/1972 | Gillespie et al. | 209/3 |
| 3,667,601 | 6/1972 | Johnston et al. | 209/466 |
| 3,720,380 | 3/1973 | Marsh | 241/DIG. 38 |

*Primary Examiner*—Granville Y. Custer, Jr.
*Attorney, Agent, or Firm*—Biebel, French & Bugg

[57] ABSTRACT

Mixed solid waste, such particularly as municipal waste, is subjected to a pulping action which results in fragmenting the glass and metal constitutes into particles of similar size, with the cast and foil aluminum being converted into the form of chunks and pellets respectively while the aluminum which is present as alloy, such as is used in cans and other food containers, is cut into flake-like particles, after which the mixed particles are dried and then subjected to agitation causing the flakes of aluminum to be concentrated at the top of the mix for separate removal by skimming or scalping. The remaining mixture of glass, aluminum and other materials is then subjected to high tension electrostatic treatment effecting separation of the glass from the other materials.

11 Claims, 2 Drawing Figures

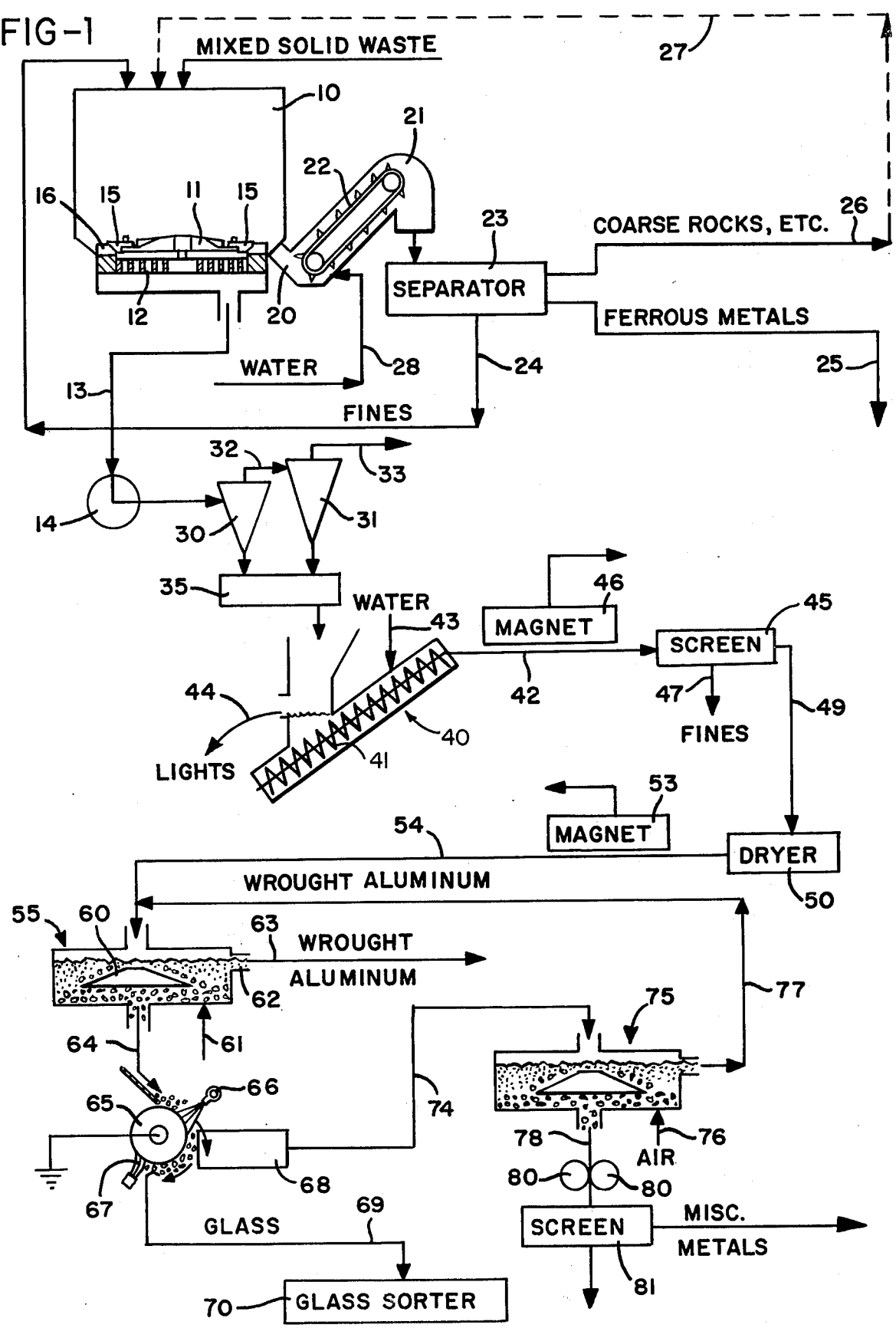

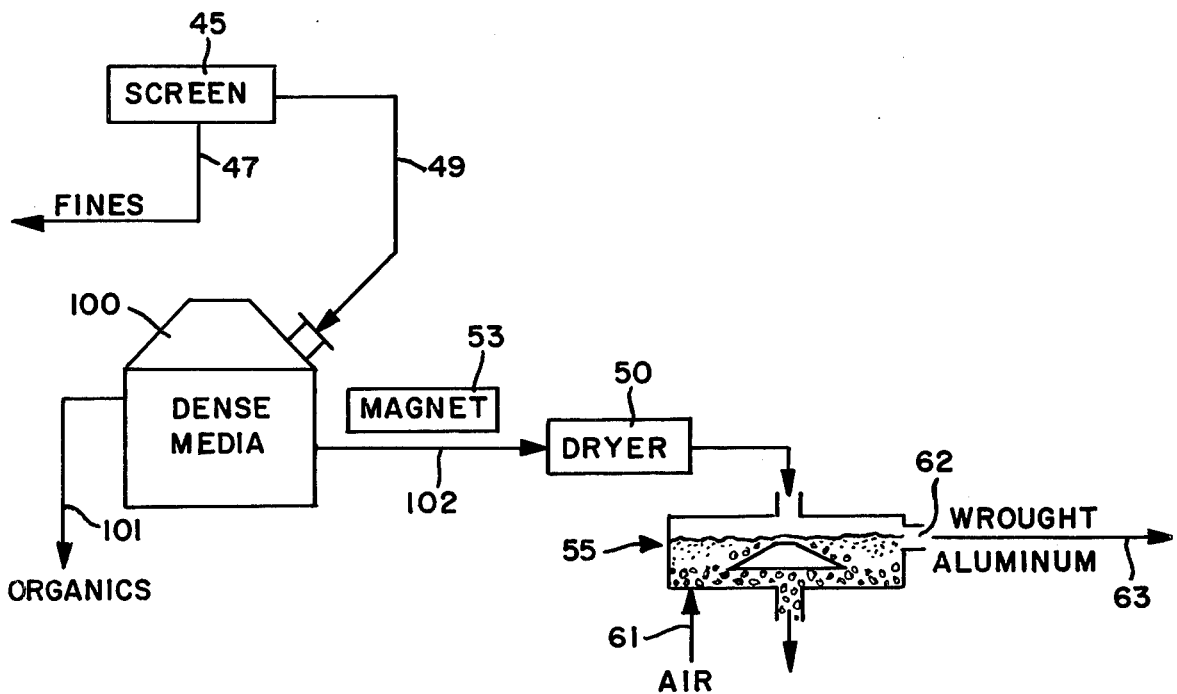
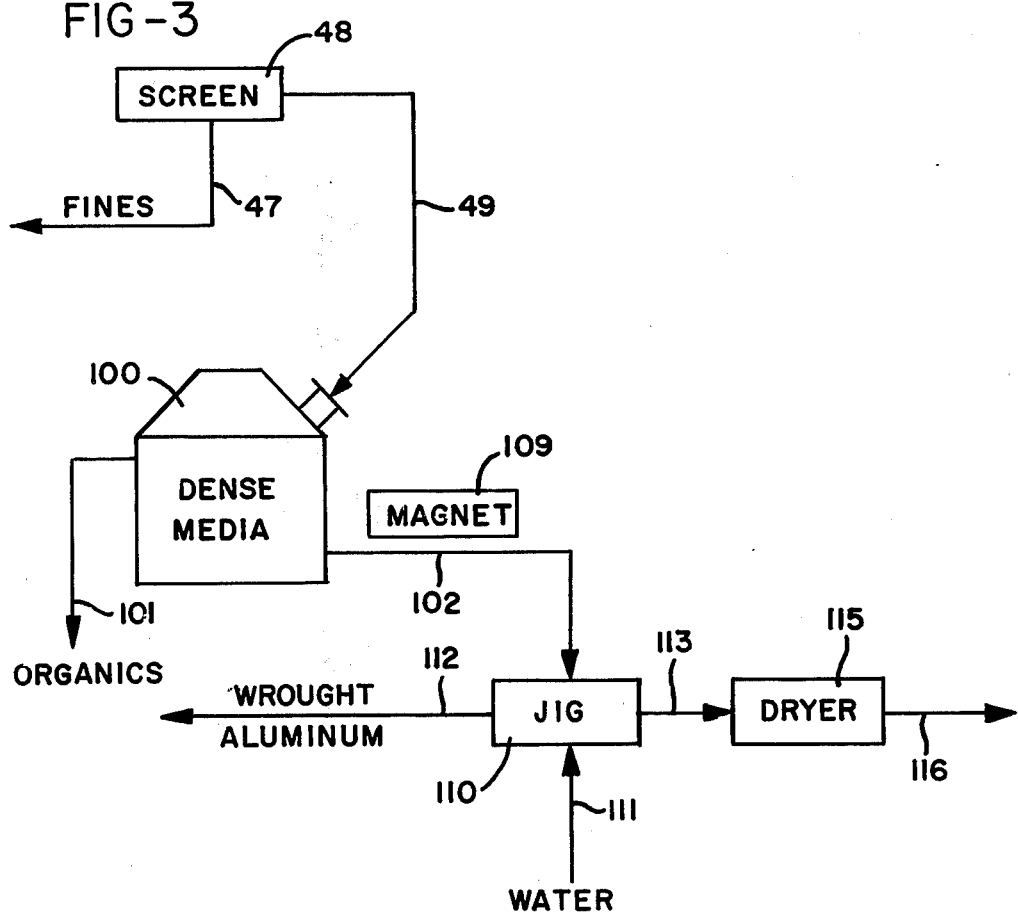

RECOVERY OF SALVAGEABLE COMPONENTS FROM WASTE MATERIALS

CROSS REFERENCE TO RELATED APPLICATIONS

This application is related to, METHOD OF WASTE TREATMENT, Ser. No. 861,778, filed Sept. 29, 1969, now U.S. Pat. No. 3,595,488; METHOD FOR THE TREATMENT OF GARBAGE AND OTHER WASTE, Ser. No. 6,041, filed Jan. 26, 1970, now U.S. Pat. No. 3,549,092; and WASTE TREATMENT AND FIBER RECLAMATION SYSTEM, Ser. No. 94,084, filed Dec. 1, 1970, now U.S. Pat. No. 3,736,223, and is a continuation in part of RECOVERY OF SALVAGEABLE COMPONENTS FROM WASTE MATERIAL, Ser. No. 332,886, filed Feb. 16, 1973 and now abandoned, which is a continuation in part of RECOVERY OF SALVAGEABLE COMPONENTS FROM WASTE MATERIAL, Ser. No. 99,986, filed Dec. 21, 1970, now U.S. Pat. No. 3,720,380.

BACKGROUND OF THE INVENTION

Solid waste materials of the type exemplified by municipal waste have traditionally presented problems of disposal which have become increasingly critical in recent years as a result of not only a rapidly increasing population but the compounding difficulty of a drastic increase in per capita production of solid waste. Conventionally, such solid waste has been disposed of by such means as incineration and landfill. Obviously, with the ever increasing concern with problems of natural resources and the dwindling supply of acreage suitable for landfill operations within a reasonable distance of population centers, both of these methods of solid waste disposal are becoming less acceptable.

While proposals have been made from time to time for processing solid waste material so that the various components thereof can be reused, a continuing problem with such proposals is the quality of the recovered material, which is often so inferior as to reduce the market value of the recovered components below that which would make such recovery operations commercially attractive or even economically feasible. For example, although reclaimed glass has a potential value for reuse as cullet in the manufacture of new glass products, a commercially feasible method of reclaiming glass from waste materials in a form suitable for such reuse has eluded the industry prior to the invention disclosed and claimed in my above U.S. Pat. No. 3,720,380.

Another method of sorting refuse to isolate reclaimable glass is disclosed in U.S. Pat. No. 3,650,396 to Gillespie et al, in which the initial steps are the same as in my U.S. Pat. No. 3,720,380, in that the refuse or trash is pulped, and passed through a cyclone separator to separate the inorganics from the water and fiber. The separated inorganics are screened to isolate particles in the size range of between ¼ inch and ¾ inch (which screening allows the particles to be subsequently optically sorted), dried, and passed through a series of pneumatic separators to separate the glass particles from the lighter weight particles. Since the object of U.S. Pat. No. 3,650,396 is to isolate the reclaimable glass, the lighter fraction produced by the separators, which are operated by passing a high volume of air upward through the columns so that the particles will separate by gravity, includes all of the lighter nonglass particles without distinction but including light weight metals, stones, bones, wood, rubber and plastics.

As is pointed out in U.S. Pat. No. 3,650,396, in addition to glass, municipal waste contains substantial quantities of both ferrous and non-ferrous metals, particularly aluminum in several forms. For example, aluminum in an alloy form is used in many cans, can tops, and containers for food, especially as trays for convenience foods such as "TV Dinners" and the like. Large quantities of relatively pure aluminum occur in solid waste as pieces of foil in a variety of thicknesses, and a third relatively common form comprises structural parts cast from aluminum, such as lawn furniture and the like.

The value of reclaimed aluminum is relatively high, and it is desirable to facilitate its recovery in as uncontaminated form as possible in order to obtain the maximum return. While U.S. Pat. No. 3,650,396 discloses that a lighter fraction including aluminum can be isolated in addition to the glass, it would not be useful in and of itself to recover all of the types of aluminum because that does not isolate aluminum alone. It is able only to isolate aluminuum along with other lightweight odds and ends. Thus to isolate a particularly valuable type of aluminum would be even further removed from the teachings of U.S. Pat. No. 3,650,396.

What is more important in the background of the present invention is that the several forms of aluminum differ among themselves in value, with the first form noted above being of significantly greater value, for a number of reasons. In particular, aluminum as used in cans and other food containers, which for purposes of distinction will be referred to herein as "wrought" aluminum, has a definite and uniform alloy content, and recovered scrap aluminum of this type can be reused for similar purposes with a minimum of processing expense. The value of this form of recovered scrap, however, depends upon its relative purity, in terms of contamination both by other forms of aluminum and by other materials.

SUMMARY OF THE INVENTION

My U.S. Pat. No. 3,720,380 describes a method and system for treating municipal waste in such manner as to recover two main classes of solid particles, namely glass and aluminum. The aluminum recovered in accordance with that application, however, includes all forms of aluminum as it occurs in municipal waste, and that application does not disclose any means or procedure for segregating any form of aluminum from the others.

It is the major objective and result of the present inventon to provide a method and system for treating municipal waste in such manner as to recover the wrought aluminum as a mass of particles relatively free from other forms of aluminum as well as contaminants of other kinds. Other results of the invention are to recover the other forms of aluminum from municipal waste as a separate mass of particles, and also to recover the glass as a third mass of particles relatively free of contaminants.

In the practice of the invention, municipal waste is deposited in a treating vessel with sufficient liquid, commonly water, to establish a suspension of pulpable consistency, e.g., up to about 6% solids. The municipal waste can be delivered to the vessel with no preliminary treatment, although it is usually desirable to eliminate massive articles therefrom, such as stoves, refrigerator, bicycles, bed springs and the like. The suspension is subjected in the treating vessel to combined forces of hydraulic and mechanical shear and mechanical impact until the following results have been achieved.

a. Large pieces of ferrous metals are removed from the vessel separately from most other constituents.
b. The wrought aluminum is cut into flake-like particles.
c. The aluminum foil is crushed into the form of pellets comparable in outline to the flake-like pieces of aluminum but of substantially great thickness.
d. The structural aluminum and other non-ferrous metals are reduced to chunks similar in overall dimensions to the pellets.
e. The mechanically reducible ferrous metal contaminants, such as tin cans, wire and miscellaneous scrap, are reduced to particles comparable in maximum dimensions to the aluminum pellets and chunks.
f. The glass and other pulverulent inorganic materials are reduced to particle sizes comparable to those of the pellets and chunks of aluminum.
g. The paper and paperboard are reduced to the form of fibers or bundles of fiber which are dispersed in the liquid.
h. The plastic and other organic materials, including food and other garbage, are similarly reduced to small particle sizes.

The range of particle sizes to which the various materials are reduced in the treating vessel is determined and controlled by means of a perforated extraction plate through which the suspension is withdrawn form the vessel. The diameter of the holes in this plate establish the maximum dimensions of the particles which can be extracted therethrough, and in practice holes of diameters in the range of 1 to 2 inches have been successfully used. The extracted suspension is then subjected to a centrifugal cleaning action for the purpose of separating as much as possible of the fiber and other organic materials from the mixed particles of aluminum, other non-ferrous metals, ferrous metal, glass and other inorganic materials, after which these solid particles are preferably washed and also screened or subjected to dense media separation to eliminate as many fine particles as possible.

After or in conjunction with the waahing of liquid and fines from the cleaned mixture, the ferrous metal particles are readily removed by magnetic separation. The mixture which remains comprises predominately aluminum, other non-ferrous metals and glass in the form of particles of relatively uniform size, or rather of a size falling within a predictable range. Test results indicate that maximum dimension of these particles will usually not exceed 1½ inches when the holes in the extraction plate are from 1 inch in diameter, and the wrought aluminum pieces extracted through one-inch holes will have an average maximum dimension of about ¾ inch and maximum cross dimension of about a ½ inch.

When the resulting mixture is agitated, as by a shaking action which may be aided by an upward current of a fluid, such as air or water, through the mixture, it has been found that the various particles interact on each other in such manner as to cause the wrought aluminum flakes to migrate to the top of the mass. The resulting concentration of wrought aluminum flakes is readily removed by a skimming or scalping action, and these flakes have been found to be relatively uncontaminated either by the other forms of aluminum or by other materials. When air is used as an aid to the agitation, it will be desirable to dry the mixture before agitating.

The glass and metals which remain in the mixture following separation of the plate aluminum are then separated from each other. The preferred method is by means of high tension electrostatic separating action with the aid of a suitable drum, the glass remaining on the drum while the aluminum and other materials drop away therefrom. This last mixture will usually include also a variety of heavy materials other than aluminum, such as stones, ceramics, and some other metals such a zinc and lead. This mixture is preferably crushed to reduce the stones and ceramics to particle sizes readily screenable from the remaining mixture of aluminum and other metals.

The primary advantage which this invention provides lies in the ease and effectiveness with which the most valuable form of scrap aluminum is reclaimed from municipal waste in such concentrated and relatively uncontaminated condition that it requires minimal processing to be ready for reuse. It is also an important feature of the invention that this advantage is achieved without reducing the reclaimability of the other forms of aluminum, the other metals, and the glass particles which are also capable of recovery from municipal waste for reuse.

BRIEF DESCRIPTION OF THE DRAWING

FIG. 1 is a somewhat schematic and fragmentary showing of a system for performing the process of the invention; and FIGS. 2 and 3 are views similar to and of a part of the system of FIG. 1 showing further embodiments of the invention.

DESCRIPTION OF THE PREFERRED EMBODIMENTS

In the practice of the invention as illustrated in FIG. 1, heterogeneous municipal waste of the general character referred to above is deposited in a treatment vessel 10 with sufficient water to dilute it to a solids content of the order of 4 to 6%. In the vessel 10, it is subjected to forces of mechanical and hydraulic sheer and mechanical impact of sufficient intensity to reduce the frangible portions of the waste to a predictable maximum particle size. This is accomplished by means of a rotor 11 rotating above a bed plate 12 having perforations therethrough of such diameter that as the solids in the mixture are reduced to the desired particle size range, they are extracted continuously from the vessel through the outlet line 13 to pump 14 with a portion of the water or other liquid in slurry form for further treatment.

U.S. Pat. No. 3,595,488, of which I am a co-inventor, show a treatment vessel particularly suited for the practice of this invention by reason of the provision therein of flails or hammer members 15 pivoted on the rotor and cooperating with stator means 16 in the form of a series of attrition bar members to effect chopping and shearing of solid materials which are engaged therebetween, such particularly as the plate aluminum components of municipal waste. The same patent shows the relationship to the rotor of an appropriate extraction plate, and for the purposes of this invention, satisfactory results are obtained with cylindrical extraction holes in the range of 1 to 2 inches in diameter.

The treatment vessel 10 is also provided with an outlet 20 located radially outwardly of the stator 16 and connecting downwardly with a junk remover 21 for removing relatively large infrangible solids, which usually include the majority of the ferrous metal pieces. A suitable junk remover is shown in detail in Baxter U.S. Pat. No. 3,549,092, and as indicated in the drawing, it includes conveyor means 22 for carrying large solids upwardly from below outlet 20 for gravity discharge to a separator 23. The separator 23 should include magnetic means for separating ferrous metals from other materials, and also means for screening liquid and fines for recirculation to the treament vessel as indicated at 24. Preferred results have been obtained when the separator 23 is adapted to deliver only pieces having a maximum dimension in the range of 4 to 6 inches to the outlet lines 25 and 26. The outlet line 26 for non-ferrous materials will include the structural aluminum, and this line may be connected at 27 back to the pulper 10 for further size reduction facilitating further treatment of this scrap aluminum in the balance of the system shown in FIG. 1.

The drawing shows a connection 28 for continuously resupplying liquid to the treatment vessel 10 to maintain the desired level of liquid therein. Preferably the liquid is supplied directly to the junk remover 21 as shown, to create a flow of liquid upwardly through the outlet 20 in counterflow relation with the heavy materials moving downwardly through the outlet 20 under the influence of gravity. This liquid counter-flow will not only wash fibrous and other small particles from the solids discharging through the outlet 20, but it has the important function of carrying back into the treatment vessel the pieces of relatively light metal which would otherwise tend to remain with the heavier ferrous pieces. This is especially true of aluminum present in the form of cans, trays and other food containers, which are thus caused to remain within the treatment vessel for commutation and extraction through the plate 12.

The ultimate effect of these conditions in a treatment vessel as described is that the aluminum tends to remain in the vessel until there has been substantial separation through the outlet 20 of the heavier metals which were present in the charge of waste materials, and the action of the rotor 11 and flails 15 on the aluminum is to reduce it to particles of sufficiently small size for extraction through the plate 12. It appears that this size reduction is effected by wadding or crumpling pieces of foil into the form of pellets of roughly spherical shape, and the cast aluminum pieces are broken and chopped into chunks similar to the pellets in size, along with the other non-ferrous metals. The wrought aluminum, however, due to the fact that it is an alloy, and thicker than foil, is stiffer and substantially more resistant to balling or wadding than is the foil. It therefore tends primarily to be cut by the flails 15 and stator 16 into predominately two-dimensional flakes which are comparable in length and width to the pellets and chunks but of a thickness comparable with the original thickness of the trays, can tops and bodies, and other aluminum elements present in the charge of waste.

Preferred results have been obtained in the practice of the invention, as noted above, by utilizing an extraction plate 12 wherein the holes are approximately 1 inch in diameter. As a practical matter with such hole sizes, the maximum dimension of the particles passing therethrough will usually not exceed 1½ inches, and the average dimensions of the wrought aluminum pieces will be of the order of ½ by ** inch. The glass and other materials which also remain in the vessel for commutation and extraction through the plate 12 will be of similar dimensions when they reach the outlet line 13.

In the next stage of a system for practicing the invention, the organic and other light materials are removed as completely as possible from the glass, aluminum, and other inorganic materials extracted through the outlet line 13. This stage is represented in the drawing by a pair of liquid cyclones 30 and 31 connected in series so that the light fraction from the first unit 30 is delivered by the line 32 to the inlet of the second cyclone 31. The light fraction from the second cyclone will comprise the great majority of the fibrous materials in the initial charge, along with other organic materials such particularly as garbage and vegetation, and this material is transported by a line 33 for whatever further treatment may be desired, such for example of recovery of fiber therefrom as disclosed in my U.S. Pat. No. 3,736,223.

The glass, aluminum and other heavy metal and non-metallic particles discharged from the cyclones 30–31 are collected by a conveyor 35 which delivers them to an elutriation tower 40 for removal of as much as possible of any remaining organic and other light materials. As indicated diagrammatically in the drawing the material discharged from the conveyor 35 passes downwardly in the tower and is then carried upwardly by conveyor means such as a screw 41 to the discharge line 42. Water or other elutriation liquid is added at 43 for upward counterflow against the heavy materials on the inlet side of the tower in order to wash light particles back out of the tower at 44, and with the water inlet 43 located, as shown, at a level below discharge line 42 but above the overflow outlet 44, the heavy materials will be washed and discharged relatively dry.

The outlet line 42 for accepted material from tower 40 leads to a screen 45 where the total bulk of solid materials is reduced by removal of fines, e.g., particles with a maximum dimension of the order of ⅛ to 3/16 inch, in order to reduce the load on the subsequent processing equipment. Preferably a magnetic drive 46 is used in conjunction with the line 42 to remove ferrous metal particles from the feed ahead of the screen 45. Satisfactory results have been obtained in the practice of the invention if 15 to 25% of the total solids present in the line 42 are removed by the discharge line 47 from the screen 45.

The material retained at the screen 45 is conducted by a line 49 to a dryer 50. To remove whatever ferrous metal particles remain in the mass, a second magnetic separator 53 is shown as located for action in conjunction with the discharge line 54 from the dryer 50.

The purpose of the dryer 50 is to prepare the solid particles for subjection to a dry separating action at the next station 55, which comprises means for agitating the mixed particles in such manner as to effect the removal of the plate aluminum pieces. Satisfactory results in the practice of the invention have been obtained when the station 55 comprises a gravity separator of the shaker screen type which includes means for providing an upward flow of air through the particles while they are being subjected to a shaking action. This is represented in the drawing by an oscillating element 60 into which the line 54 delivers the particulate mixture, and the air supply is represented by the arrow 61.

The practice of the invention has established that under these conditions, the various particles in the mixture interact with each other in such manner as to cause the aluminum flakes to be concentrated in the top layer from which they are readily removed by a mechanical scalping action or by a skimming action such as may be effected by causing the top layer to flow over a weir 62 to the outlet line 63. Apparently this result is in large measure due to the physical characteristics of the wrought aluminum flakes with relation to the other particles in the mixture. More specifically, these flakes have relatively large surface areas in comparison with their bulk and weight, and agitation causes them to migrate upwardly in the mixture.

This concentrating action can be carried out by agitation alone, but it is accelerated in the presence of an upward flow of a fluid, such as air, through the mixture, as indicated at 61. An example of a commercially available apparatus which is suitable for this purpose is a vibrating Bauer Specific Gravity Separator.

The wrought aluminum flakes recovered in the manner just described have been found to be relatively free not only of glass and other materials, but also of the other forms of aluminum which were present in the original waste, namely the chunks and pellets into which the cast and foil aluminum is reduced, as well as the other non-ferrous metal particles. The wrought aluminum recovered in this manner is accordingly of such high quality that it can be prepared for reuse for the same purposes as before with minimum further processing.

The material remaining in the mixture from which the wrought aluminum pieces have been removed has been found to comprise primarily glass, aluminum in chunk and pellet form, other metals including brass, bronze, copper, zinc and lead, and a residue of non-metallic materials such particularly as ceramics and stones. These materials are delivered by a line 64 to the next stage of the system where the mixture is subjected to high tension electrostatic separating forces with the aid of a grounded drum 65 and high voltage charging electrode 66 which cooperate to pin the glass particles and other non-conductors to the drum for removal by wiper 67, while the particles of conducting materials are thrown off the drum surface to a collecting bin 68.

The invention contributes significantly to the efficiency of the electrostatic sorting procedure, because the majority of the particles of relatively large area are removed at station 55. The mass delivered to the drum 65 therefore comprises predominately particles of small area which are correspondingly more responsive to electrostatic forms.

The glass removed from drum 65 is conducted away at 69 for separation in accordance with color by optical sorting means 70, such as are shown in Gillespie et al., U.S. Pat. No. 3,650,396. The materials which collect in the bin 68 are preferably delivered by line 74 to a second shaker screen station 75, which may be a duplicate of station 55 having an air inlet 76, for separation of whatever wrought aluminum was not removed at station 55. The accepted material from station 75 will usually include more than wrought aluminum, and it is therefore recycled at 77 to the inlet side of station 55 to assure both that the maximum feasible amount of the plate aluminum is recovered separately and also that it is in as uncontaminated condition as possible.

The materials rejected at the station 75 are delivered by a line 78 to a crushing station, represented by a pair of rolls 80, for the purpose of crushing the ceramic, stone, and other hard non-metallic materials of minimum value to a sufficiently fine particle size for ready elimination by screening as indicated at 81. The remaining metal particles can be sold as a mixture, or separated by conventional chemical or other treatments into the individual metal components. Since the majority of this material will usually be aluminum, it can readily be recovered for reuse for purposes requiring a lower grade of metal than the plate aluminum removed at station 55.

FIGS. 2 and 3 shown further embodiments of the invention in the form of modifications of the system of FIG. 1. To the extent possible, the same reference numerals as in FIG. 1 are used for the same parts in FIGS. 2 and 3. Basically, the modifications in FIGS. 2 and 3 involve the use of a dense media separator to effect removal of the organic and other light materials from the glass and metal particles.

As shown in FIG. 2, the particles accepted by the screen 45 are conveyed by line 49 to dense media separator 100, where separation is effected in a manner conventional in the art by means of a fluid medium (not shown) such as a fluid having a specific gravity which is between the specific gravities of materials to be separated, so that as with the materials involved herein, the organic and other light materials (having a lesser specific gravity than the medium) will be separated from the remaining glass, aluminum and other particles having a greater specific gravity than the medium. The organics and other light materials are taken out of the top of the dense media separator 100 by line 101, while the greater specific gravity particles, i.e., aluminum, glass, other metals, ceramics, and stones, are removed by line 102 from the bottom of separator 100 to dryer 50 to prepare the solid particles for the remaining process steps shown in FIG. 1, including passing the particles through shaker-separator 55 so that the flakes of wrought aluminum can be separated from the mass.

The process shown in FIG. 3 is similar to that of FIG. 2, except that instead of drying the solid particles from output 102 from dense media separator 100 as in FIG. 2, the wet particles are passed directly under a magnetic separator 109 to a jig 110. Jig 110 operates in essentially the same manner as station 55 in that it is a shaker screen wherein the interaction of the shaking particles causes the flake-like wrought aluminum particles to migrate to the top and to be skimmed off, while the block-like particles migrate to the bottom and are passed on to further processing. Basically, the only difference between station 55 and jig 110 is that station 55 uses air as the fluid to aid the separation of the particles while jig 110 uses water as the fluid, as indicated at 111. The flake-like aluminum particles are recovered at 112. The block-like bottom particles are passed out at 113 to a dryer 115 wherein the remaining particles are dried and then passed by line 116 to the further glass sorting steps as shown in FIG. 1.

While the methods herein described constitute preferred embodiments of the invention, it is to be understood that the invention is not limited to these precise methods, and that changes may be made therein without departing from the scope of the invention.

What is claimed is:

1. The method of salvaging scrap aluminum from heterogeneous municipal waste materials which comprises the steps of:
   a. depositing such waste material and a liquid in treating vessel,
   b. subjecting the resulting suspension to combined forces of hydraulic and mechanical shear and mechanical impact causing the frangible solids therein to be reduced to the following:
      i. flake-like particles of aluminum alloy,
      ii. other metal particles including pellets of aluminum foil,
      iii. particles of glass and other pulverulent inorganic materials,
      iv. fiber and other organic materials in particle form,
   c. extracting said reduced materials of less than a preselected maximum particle size from the remainer of said suspension,
   d. treating said extracted materials to separate the majority of said fiber and other organic materials from said particles of aluminum, other metal, and glass and other inorganic materials,
   e. removing fines from the resulting mass of aluminum, other metal, and glass and other inorganic particles to establish a predetermined small range of sizes for the remaining mass of particles,
   f. causing physical interaction of the various particles in said remaining mass of aluminum, other metal, and glass and other inorganic particles within said range of sizes by agitating said mass until said aluminum flake-like particles migrate to the top surface portion of said mass, and
   g. effecting removal of the resulting concentrated aluminum flake-like particles from the top surface portion of said mass by a skimming action.

2. The method defined in claim 1 wherein said agitation is carried out in the presence of an upward flow fluid therethrough.

3. The method defined in claim 1 wherein said agitation is carried out in the presence of an upward flow of liquid therethrough.

4. The method defined in claim 1 comprising the further step of substantially drying said mass of aluminum, glass and other inorganic particles prior to subjecting the same to agitation.

5. The method defined in claim 4 wherein said mass of aluminum, glass and other inorganic particles is subjected to agitation in the presence of an upward flow of gaseous fluid therethrough.

6. The method defined in claim 1 wherein said treating step (d) is carried out in a fluid medium having a specific gravity between those of said organic materials and those of aluminum and glass.

7. The method of salvaging scrap aluminum from heterogeneous municipal waste materials which comprises the steps of:
   a. reducing said materials to a particulate mixture consisting essentially of:
      i. flake-like particles of aluminum alloy,
      ii. other metal particles including pellets of aluminum foil,
      iii. particles of glass and other pulverulent inorganic materials,
      iv. all of said particles being of a particle size within a predetermined small range,
   b. causing physical interaction of the various particles in said mixture by agitating said mixture until said aluminum flake-like particles migrate to the top surface portion of said mixture, and
   c. effecting removal of the resulting concentrated aluminum flake-like particles from the top surface portion of said mixture by a skimming action.

8. The method defined in claim 7 wherein said particulate mixture is subjected to said agitation in the presence of an upward flow of fluid therethrough.

9. The method defined in claim 8 wherein said fluid is air.

10. The method defined in claim 8 wherein said fluid is water.

11. The method defined in claim 7 wherein said particle size range is approximately 3/16 inch to 1½ inches.

* * * * *

UNITED STATES PATENT AND TRADEMARK OFFICE
CERTIFICATE OF CORRECTION

PATENT NO. : 3,945,575
DATED : March 23, 1976
INVENTOR(S) : Paul G. Marsh

It is certified that error appears in the above-identified patent and that said Letters Patent are hereby corrected as shown below:

In The Abstract - Line 3, "constitutes" should be

--constitutents--.

Column 3, Line 48 - "waahing" should be --washing--.

Column 6, Line 4 - "**" should be --3/4--.

Column 8, Line 14 - "shown" should be --show--.

Signed and Sealed this

Seventh Day of September 1976

[SEAL]

Attest:

RUTH C. MASON
*Attesting Officer*

C. MARSHALL DANN
*Commissioner of Patents and Trademarks*